United States Patent [19]

McWilliams et al.

[11] Patent Number: 5,025,567

[45] Date of Patent: Jun. 25, 1991

[54] ILLUMINATED SPIRIT LEVEL USING FIBER OPTIC DEVICES

[76] Inventors: Robert E. McWilliams, 3421 Echo Dr., Springfield, Ohio 45502; Robert L. Karg, 4190 Wolford Rd., Xenia, Ohio 45385

[21] Appl. No.: 364,090

[22] Filed: Jun. 6, 1989

[51] Int. Cl.[5] .............................. G01C 9/32
[52] U.S. Cl. .................... 33/348.2; 33/366; 33/348
[58] Field of Search ............... 33/348, 348.2, 366, 33/241

[56] References Cited

U.S. PATENT DOCUMENTS

| | | | |
|---|---|---|---|
| 1,582,149 | 4/1926 | Stowell | 33/348 |
| 1,818,843 | 8/1931 | Dill | 33/348.2 |
| 2,367,858 | 1/1945 | Flynn | 33/348 |
| 2,615,122 | 10/1952 | Coombs | 33/348 |
| 2,790,069 | 4/1957 | Alexander | 33/348 |
| 3,046,672 | 7/1962 | Lace | 33/348 |
| 3,309,774 | 3/1967 | Cloutter | 33/348 |
| 3,584,387 | 6/1971 | Sturm | 33/366 |
| 4,079,521 | 3/1978 | Uhorczak | 33/366 |
| 4,139,949 | 2/1979 | Goldman | 33/348 |
| 4,625,423 | 12/1986 | Sackett | 33/366 |
| 4,627,171 | 12/1986 | Dudney | 33/241 |
| 4,670,701 | 6/1987 | Sako et al. | 320/2 |
| 4,677,362 | 6/1987 | House, II et al. | 320/2 |
| 4,794,315 | 12/1988 | Pederson et al. | 320/2 |
| 4,833,788 | 5/1989 | Munro | 33/348.2 |
| 4,835,452 | 5/1989 | Kuriyama | 320/2 |
| 4,876,798 | 10/1989 | Zimmerman | 33/348.2 |

FOREIGN PATENT DOCUMENTS

| | | | |
|---|---|---|---|
| 2754030 | 6/1979 | Fed. Rep. of Germany | 33/348.2 |
| 8810408 | 12/1988 | Int'l Pat. Institute | 33/366 |

Primary Examiner—William A. Cuchlinski, Jr.
Assistant Examiner—Christopher W. Fulton
Attorney, Agent, or Firm—Richard C. Litman

[57] ABSTRACT

An illuminated spirit level containing fiber optic cables for the transmission of light from the self contained light source to the level vials is disclosed. The lighting system provides for several improvements over other such devices, including a light chamber with a highly reflective interior for containment of the light source and fiber optic cable ends, and opposite cable ends formed to closely fit the contours of the level vials for greater light transmission efficiency. Provision is made for recharging the batteries, and inadvertent actuation of the system may be prevented by locating the switch within an aperture contained within the level frame, a momentary on or pushbutton type switch, and/or the inclusion of a delay circuit providing automatic deactivation of the circuit when a predetermined time has elapsed after activation. The electrical components may be secured within the level by cover plates, which also provide secure storage for a spare electrical bulb.

6 Claims, 2 Drawing Sheets

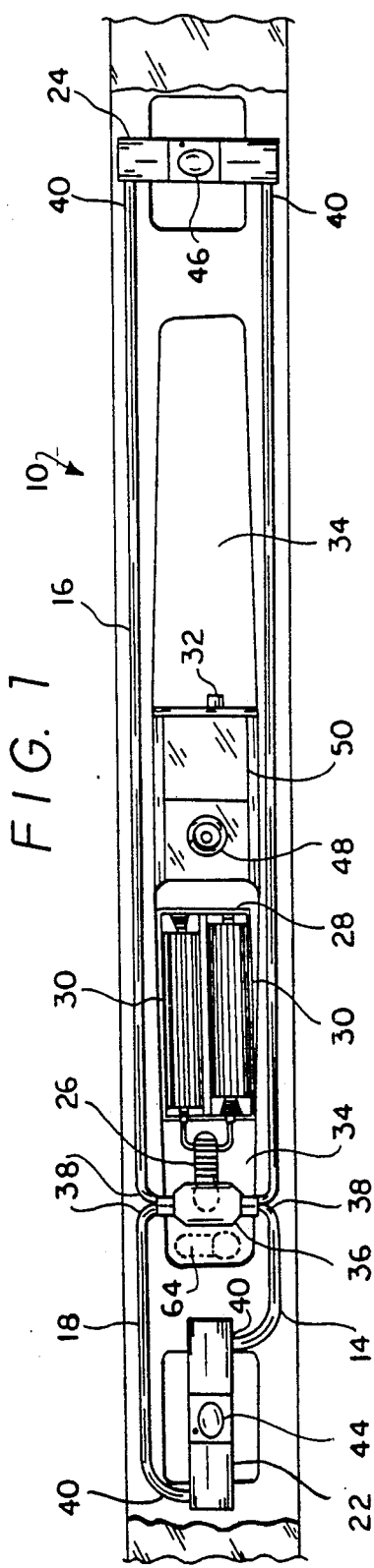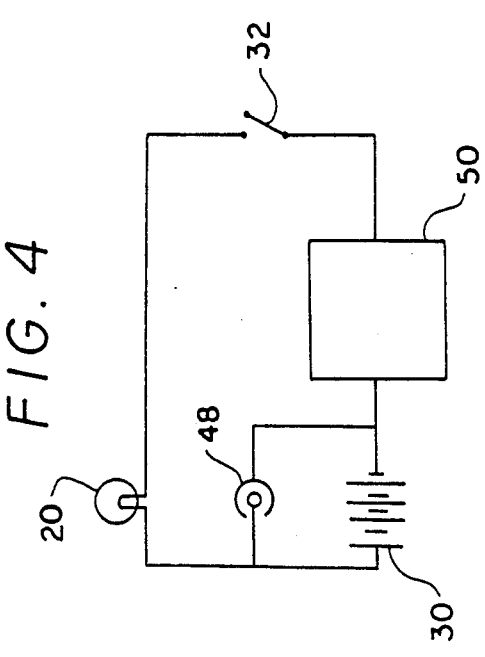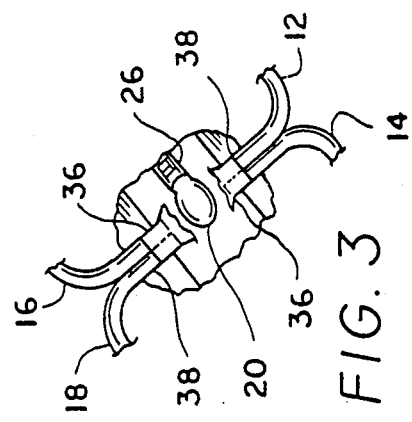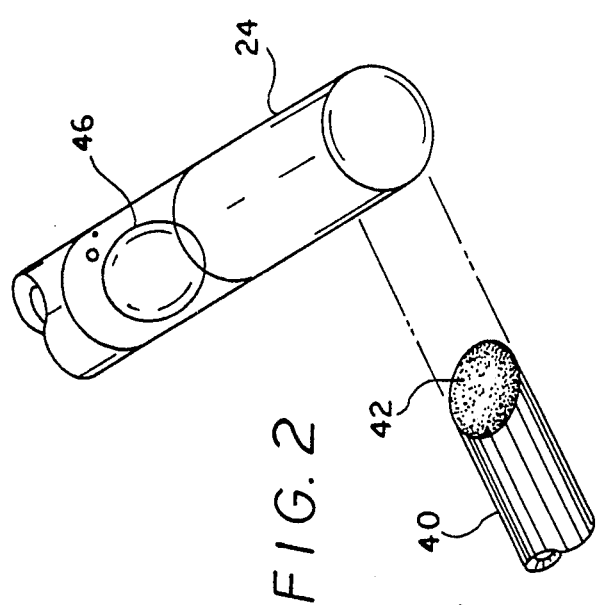

ILLUMINATED SPIRIT LEVEL USING FIBER OPTIC DEVICES

FIELD OF THE INVENTION

This invention relates generally to instruments used for the determination of level surfaces, and more specifically to such an instrument incorporating a self contained internal lighting system including a fiber optic light transmission system.

BACKGROUND OF THE INVENTION

Leveling instruments, particularly spirit levels, are a well known and valuable tool for those persons engaged in the building and construction field. These instruments generally comprise an elongated straightedge or rule of sufficient thickness to contain one or more level vials. The vials are of generally cylindrical shape, but are slightly curved or of slightly larger diameter in the center to allow the gas bubble contained within the liquid in the vial to seek the center of the vial when the instrument is level.

As noted above, this principle is well known and provides for an accurate and efficient tool due to its inherent simplicity. This simplicity, however, causes some inherent limitations, one of which is the difficulty in accurately reading the instrument in conditions of low light. Typically, no electrical power or installed lighting is available at the time such levels are being used for basic construction alignment. While levels using electric lighting to illuminate the level vial(s) are known, they are not widely used due to various limitations of the illumination systems heretofore provided. Thus, many persons in the field prefer to use a separate source of illumination, such as a flashlight or even a cigarette lighter, to provide the illumination needed to accurately read the instrument in the low light conditions commonly associated with building and construction job sites.

What is needed is an illuminated spirit level incorporating fiber optic light transmission means in order to provide for ease and economy of manufacture. The switch for such a device should be located in a protected location to preclude the accidental actuation of the lighting system and discharging of the battery. The device may also include other functional improvements, such as rechargeable batteries and an adapter plug to permit their recharging without the need for their removal and a timer providing for the automatic shutoff of the circuit after a given time to preclude the accidental discharging of the batteries.

DESCRIPTION OF THE RELATED ART

Leveling instruments of various kinds incorporating lighting systems to aid the user in reading the instrument are well known. McCullough U.S. Pat. No. 1,001,206 is an early example. While this device does fill the basic need, the plurality of bulbs needed (one per level vial) tend to decrease the overall reliability of the device compared to the present invention, and the exposed switch allows a greater possibility of accidental actuation.

Winner et al. U.S. Pat. No. 1,453,888 discloses a level using a single light source to illuminate a plurality of vials. While such an improvement is desirable from the standpoint of reliability, the necessarily centralized location of the light source will tend to provide relativelY uneven lighting for the plurality of level vials contained within the instrument. Also, no provision is made for the storage or carriage of a spare electrical bulb should the single source of illumination fail.

Flynn U.S. Pat. No. 2,367,858 also provides a single light source for a plurality of vials in a leveling instrument. Light transmission by means of "LUCITE" rods is disclosed. While these rods provide for light transmission to the areas of a plurality of vials from a single light source, some efficiency is lost due to the lack of direct contact between the light transmitting rods and the vials themselves. Also, by their inherently relatively inflexible nature as compared to fiber optic cables, such rods may be jarred from their proper alignment due to rough handling, as often happens in the use of such instruments in the building and construction trade, and therefore lose efficiency in the transmission of light through their various junctures as they become misaligned. The use of a solid, relatively stiff material also leads to greater difficulty in manufacture, since the "LUCITE" rods must be formed specifically for each different model of level in which there are to be used. The fiber optic cables of the present invention allow themselves to be quickly and easily installed as desired in any configuration due to their flexible nature.

None of the above noted patents, either singly or in combination, are seen to disclose the specific arrangement of components disclosed by the present invention.

SUMMARY OF THE INVENTION

By the present invention, an improved lighting system for use in spirit levels is provided. The improved lighting sYstem incorporates a single light source providing illumination for a plurality of level vials and various other improvements in the optical and electrical systems of such an illuminated spirit level.

Accordingly, one of the objects of the present invention is to provide illumination for a plurality of level vials from a single light source by means of fiber optic cables.

One of the other objects of the present invention is to provide for the illumination of each end of each level vial to be illuminated, by providing two fiber optic cables for each vial.

Another object of the present invention is to provide for increased efficiency of illumination by shaping the ends of the fiber optic cables in a cooperating manner, so that the entire surface of each fiber optic cable end which is adjacent to a level vial is in contact with the surface of the level vial.

Yet another object of the present invention is to provide for greater illumination for the fiber optic cables by means of a chamber enclosing the light source and containing a highly reflective interior.

Still another object of the present invention is to provide for greater protection from accidental actuation of the electrical system, thereby reducing the possibility of accidental battery discharge.

An additional object of the present invention is to provide for the convenient recharging of the batteries of the system, should such rechargeable batteries be installed.

A further object of the present invention is to provide space for the storage of a spare electrical bulb.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 1 is a top view, partially broken, of a typical level instrument incorporating the illumination system of the present invention.

FIG. 2 is a perspective view in section of a level vial and fiber optic cable, demonstrating the cooperating fit therebetween.

FIG. 3 is a perspective view in section of the light chamber, bulb, and fiber optic cables.

FIG. 4 is an electrical schematic of the circuitry of the illumination system.

Similar reference characters designate corresponding parts throughout the several figures of the drawings.

DESCRIPTION OF THE PREFERRED EMBODIMENT

Figure 5:
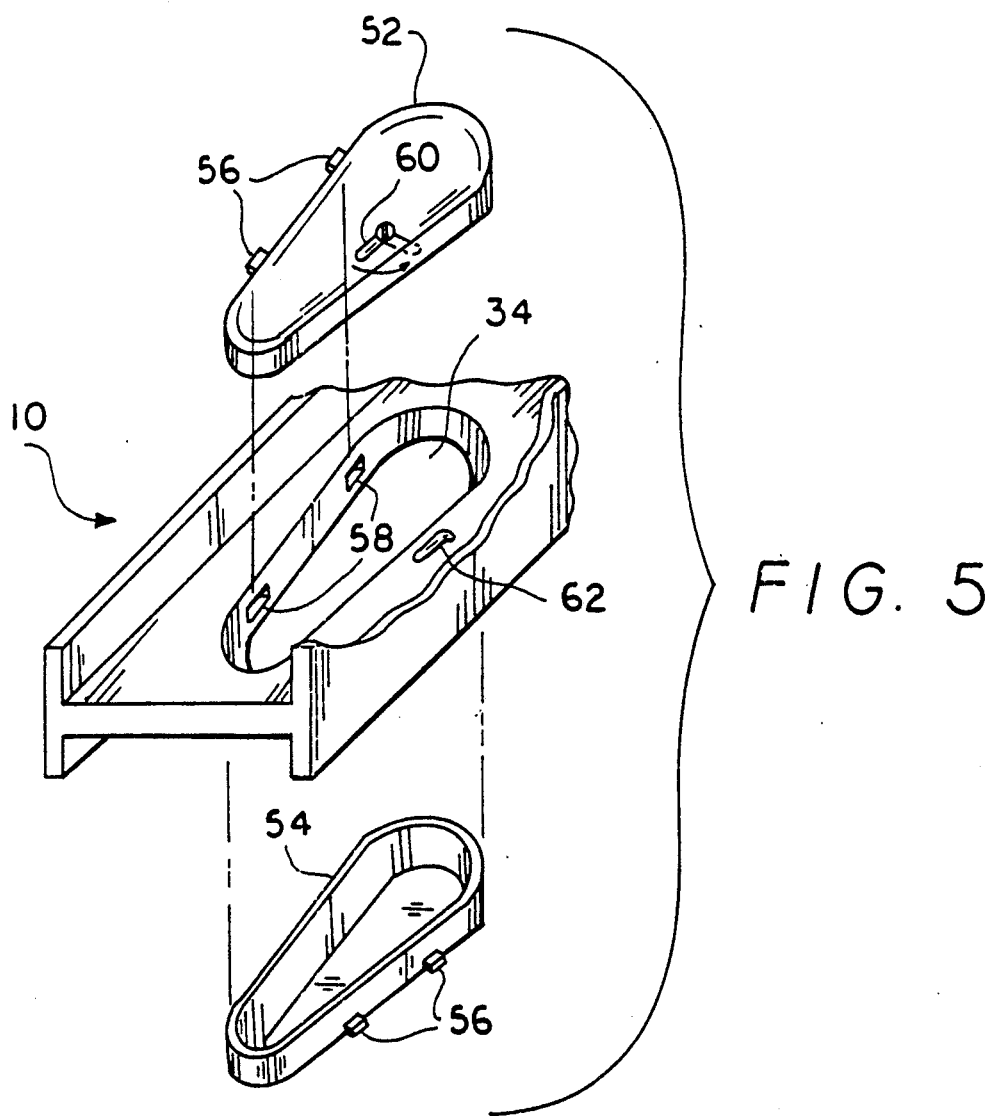
FIG. 5 is a perspective view of the enclosure for the electronic components of the level.

Referring now to the drawings, particularly FIG. 1, the present invention will be seen to relate to an illuminated spirit level 10 incorporating fiber optic cables 12, 14, 16, and 18 as well as several other improvements. Fiber optic cables 12 through 18 receive light from bulb 20 and allow light from bulb 20, more clearly seen in FIG. 3, to pass along the length of cables 12 through 18 to vials 22 and 24. Additional fiber optic cables may be included to illuminate additional vials if desired. Bulb 20 may be of any suitable type of the proper size and voltage and is threaded or otherwise secured within socket 26 adjacent to battery box 28. Batteries 30 may be of conventional dry cell type or may be rechargeable batteries of suitable size and voltage. A switch 32 is installed to activate the electrical circuit defined by the above components.

As any spirit level must provide for the installation of one or more level vials, such levels are of sufficient thickness to contain the above components 12 through 32 completely within the structure of the level. Level 10 may be routed or otherwise hollowed to provide an aperture or space 34 for the installation of the above components 12 through 32, or alternatively the space 34 which may be provided for a hand grip may be used for the installation of components 12 through 32. Space 34 also provides for the installation of the protruding portion of switch 32, rather than requiring the installation of the protruding portion of switch 32 on some outside surface of level 10 where it would be more subject to inadvertent actuation or damage.

While the fiber optic cables 12 through 18 are capable of providing sufficient light to vials 22 and 24 to allow them to be read in dimly lighted conditions, several other improvements have been incorporated in the present invention in order to increase the efficiency of the device. As noted above, each vial 22 and 24 has a fiber optic cable 12 through 18 installed at each end of each vial 22 and 24, thus providing twice the light that a single fiber optic cable or other light transmissive device may deliver. Additionally, bulb 20 is installed within chamber 36 in order to contain the light emitted by bulb 20 and cause it to be reflected to the pickup ends 38 of fiber optic cables 12 through 18. The interior of chamber 36 is preferably of a highly reflective color and surface finish so as to more efficiently reflect any light emitted by bulb 20.

Emitting ends 40 of fiber optic cables 12 through 18 are contoured to closely conform to the contours of vials 22 and 24, as more clearly seen in FIG. 2. BY thus forming ends 40, each strand 42 will be in extremely close proximity or in direct contact with the outer surface of vial 22 or 24. As vials 22 and 24 are formed of a light transmissive substance such as glass or a clear plastic, the light transmitted bY cables 12 through 18 may pass most efficiently from ends 40 to vials 22 and 24, allowing the maximum amount of light to reach and illuminate bubbles 44 and 46 contained within vials 22 and 24, thus allowing bubbles 44 and 46 within vials 22 and 24 to be more easily seen. Thus, the fiber optic cables directly illuminate the vials themselves rather than the area around the vials.

In order to further enhance the utility of level 10, batteries 30 may be of the rechargeable type as noted above and a charging jack or adapter 48 may be installed. It is beyond the scope of the present invention to incorporate a recharging device within level 10. Rather, by incorporating only a jack or adapter 48 any suitable charging device may be utilized to recharge batteries 30 from standard household current, 12 volt d. c. as provided in automotive electrical systems, or conceivably other sources of electrical power.

A common problem of such relatively simple electronic devices is that of the user failing to turn the switch off after use, or inadvertently bumping the switch without realizing that he or she has done so, thereby causing the battery or batteries to be discharged. Recharging jack 48 helps to overcome such a problem should it occur, but such recharging requires some time to be completed and moreover the incorporation of such a jack 48 does nothing to eliminate the cause of the problem in the first place. Two methods are provided in the present invention to overcome the above noted problem: First, a normally off switch such as a pushbutton type switch may be installed. While such a switch automatically opens the circuit when released, the operation of such a switch may be awkward and cumbersome for the user to actuate while also attempting to seek and mark a level line while simultaneously holding the instrument. Alternatively, the incorporation of a delay switch 50 is provided in order to automatically open the circuit after some predetermined time has elapsed. In this way the user may activate the circuit by turning on the switch 32 and merely set the level 10 aside after use, allowing delay switch 50 t automatically deactivate the circuit and thereby preclude inadvertent discharge of the batteries 30.

Means are provided for the containment of the various components 20 through 50 by covers 52 and 54, as shown in FIG. 5. Upper cover 52 and lower cover 54 are equipped with tabs 56 which are formed so as to engage slots 58 which may be formed within the sides of aperture 34. Pivotable retainer tabs 60 are located on covers 52 and 54 opposite the sides containing tabs 56, and corresponding keepers 62 are located adjacent to the edge of opening 34 in order to hold pivotable tab 60 and thus cover 52 securely in place when engaged. Thus, access may be gained to aperture 34 in order to replace batteries 30, bulb 20, or for any other reason by pivoting retainer tab 60 from beneath its keeper 62, thereby freeing one edge of cover 52 or 54, and removing tabs 56 from their engagement with slots 58. The aperture 34 containing components 20 through 50 may be provided with sufficient space to also contain a spare bulb 64, access to which may be gained by removing upper or lower cover 52 or 54 in the manner described above. Alternatively, other securing means for covers 52 and 54 may be incorporated, such as hinges and/or covers which may be flexibly deformed for engagement and disengagement from corresponding tabs and/or slots, etc.

It is to be understood that the present invention is not limited to the sole embodiment described above, but encompasses any and all embodiments within the scope of the following claims.

I claim:

1. A spirit level containing at least one transparent level vial of approximate cylindrical shape and providing electrical illumination therefor, said spirit level comprising an elongated frame, said frame defined by two parallel working surfaces and providing at least one aperture passing through said frame, said aperture forming a storage enclosure in conjunction with two removable covers, one cover placed over each open side of said at least one aperture, said covers detachably engage with said aperture, an electrical illumination means comprising one or more electrical batteries, a single light source having a radiating end and a contact end, and switching means, fiber optic light transmission cables having light reception ends and light emission ends, and providing light transmission from said electrical illumination means to each end of each said transparent vial, said light reception ends of said fiber optic cables and said radiating end of said light source contained within a chamber, said contact end of said light source being external to said chamber, said chamber having a highly reflective interior surface, and said light emission ends of said fiber optic cables formed to closely cooperate with and directly contact the surface of said at least one transparent level vial adjacent to each end of said at least one vial.

2. The spirit level of claim 1 wherein:

said switching means comprises a momentary on type switch, normally biased to the off position.

3. The spirit level of claim 1 wherein:

said electrical illumination means include a delay switch, whereby said electrical illumination means may be activated by a user and automatically deactivated by said delay switch after a predetermined period of time has elapsed from activation.

4. The spirit level of claim 1 wherein;

said switching means is located within said at least one aperture, thereby providing protection from inadvertent actuation of said switching means.

5. The spirit level of claim 1 wherein;

said electrical illumination means include an adaptor capable of cooperating with an external battery charging device.

6. The spirit level of claim 5 wherein;

said electrical batteries are rechargeable.

* * * * *